Dec. 2, 1969   S. A. AIJALA   3,481,224
SAW SHARPENING MACHINE
Filed Jan. 11, 1967   4 Sheets-Sheet 1

INVENTOR
SULO A. AIJALA
BY
Barlow & Barlow
ATTORNEYS

Dec. 2, 1969 S. A. AIJALA 3,481,224
SAW SHARPENING MACHINE
Filed Jan. 11, 1967 4 Sheets-Sheet 2

INVENTOR
SULO A. AIJALA
BY
Barlow & Barlow
ATTORNEYS

INVENTOR
SULO A. AIJALA

BY Barlow & Barlow
ATTORNEYS

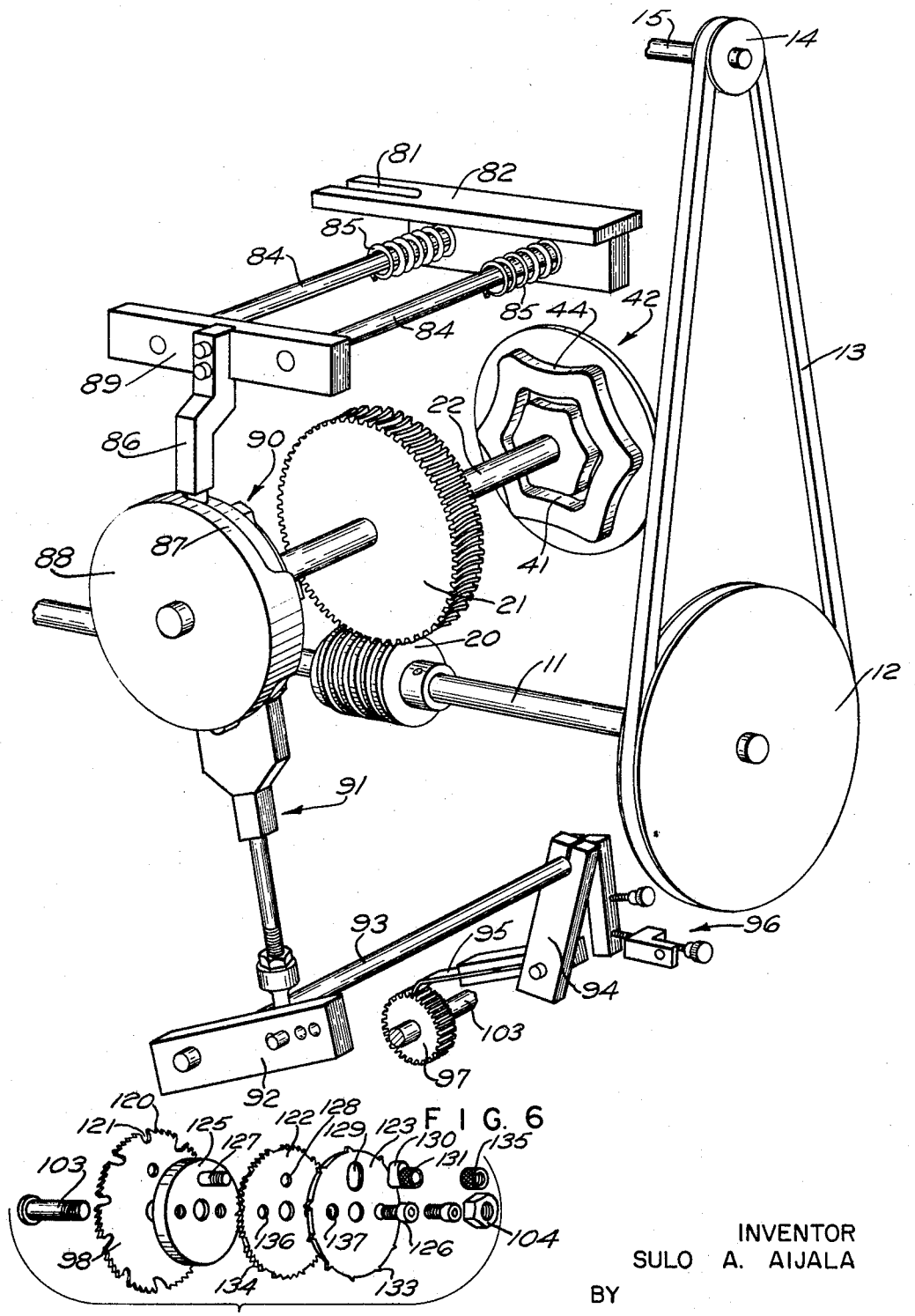

United States Patent Office 3,481,224
Patented Dec. 2, 1969

3,481,224
SAW SHARPENING MACHINE
Sulo A. Aijala, Attleboro, Mass., assignor to Intricate Machine & Engineering Inc., a corporation of Massachusetts
Filed Jan. 11, 1967, Ser. No. 608,579
Int. Cl. B23d *63/12;* B24b *7/00;* B28d *1/16*
U.S. Cl. 76—40                                                                11 Claims

ABSTRACT OF THE DISCLOSURE

A saw sharpening machine having a grinding wheel which is mounted for vertical and horizontal reciprocation and oscillation. Cam controls provide a desired grinding pattern.

---

This invention relates to a machine for sharpening either straight reciprocating saws or circular saws.

A saw which may be either circular or straight reciprocating type is formed of a blade with a plurality of teeth along an edge thereof. These teeth fall into the class of cross cut or rip or a combination of the two and may take various shapes. It is this latter type that it is difficult to sharpen by machine because of the irregular teeth or shapes thereof in a single saw blade.

In the machine of this invention the blade of the saw is held in the plane of the blade although the toothed edge may be progressively advanced a tooth at a time in said plane. Thus, it is unnecessary to rock the saw blade in order to obtain an angle on the teeth, all motion being provided in the grinding wheel which is to operate upon the saw teeth. The grinding wheel is mounted for movement up and down vertically, also left and right horizontally, and also may be swung about an axis passing through its center for angular relation with reference to the work. By reason of cam controls, the edge of the grinding wheel may be made to move in any desired pattern or a series of different patterns as the combination of cams may direct. Also the grinding wheel may be lifted clear of the work at any time by a hand operation. The grinding wheel is driven by one electric motor, while a second variable speed electric motor operates the drive for the cams which control the pattern which the grinding wheel will take to follow the shape of the teeth of the work, and the drive from this second motor will, at the same time, advance the work progressively in a timed relation with the cam drive.

One of the objects of this invention is to provide a better control for the moving parts so that more accuracy may be had.

Another object of the invention is to depend on a cam shape rather than a sawtooth shape for governing the pattern that the sharpening wheel will take.

Another object of the invention is to provide a saw sharpening machine which, regardless of the shape that the teeth may have, a cam will cause the sharpening wheel to reproduce the shape of the teeth, it being merely necessary to select the proper cam for any required sawtooth arrangement which is to be operated upon and interchange readily accessible cams if necessary.

Another object of the invention is to produce any pattern or different patterns of complex tooth form by a set of cams for each pattern to govern the shape produced by a sharpening wheel.

Another object of the invention is to provide a machine which may be programmed to produce a sufficiently irregular pattern so as to prevent chatter which often occurs from rhythm action.

Another object of the invention is to eject grit or dust from the operating parts of the machine.

With these and other objects in view, the invention consists of certain novel features of construction as will be more fully described and particularly pointed out in the appended claims.

In the accompanying drawings:

FIG. 6 is a perspective view showing the drive mechanism for various parts;

FIG. 9 is an exploded view illustrating an alternate form of ratchet teeth.

Figures 1, 2:
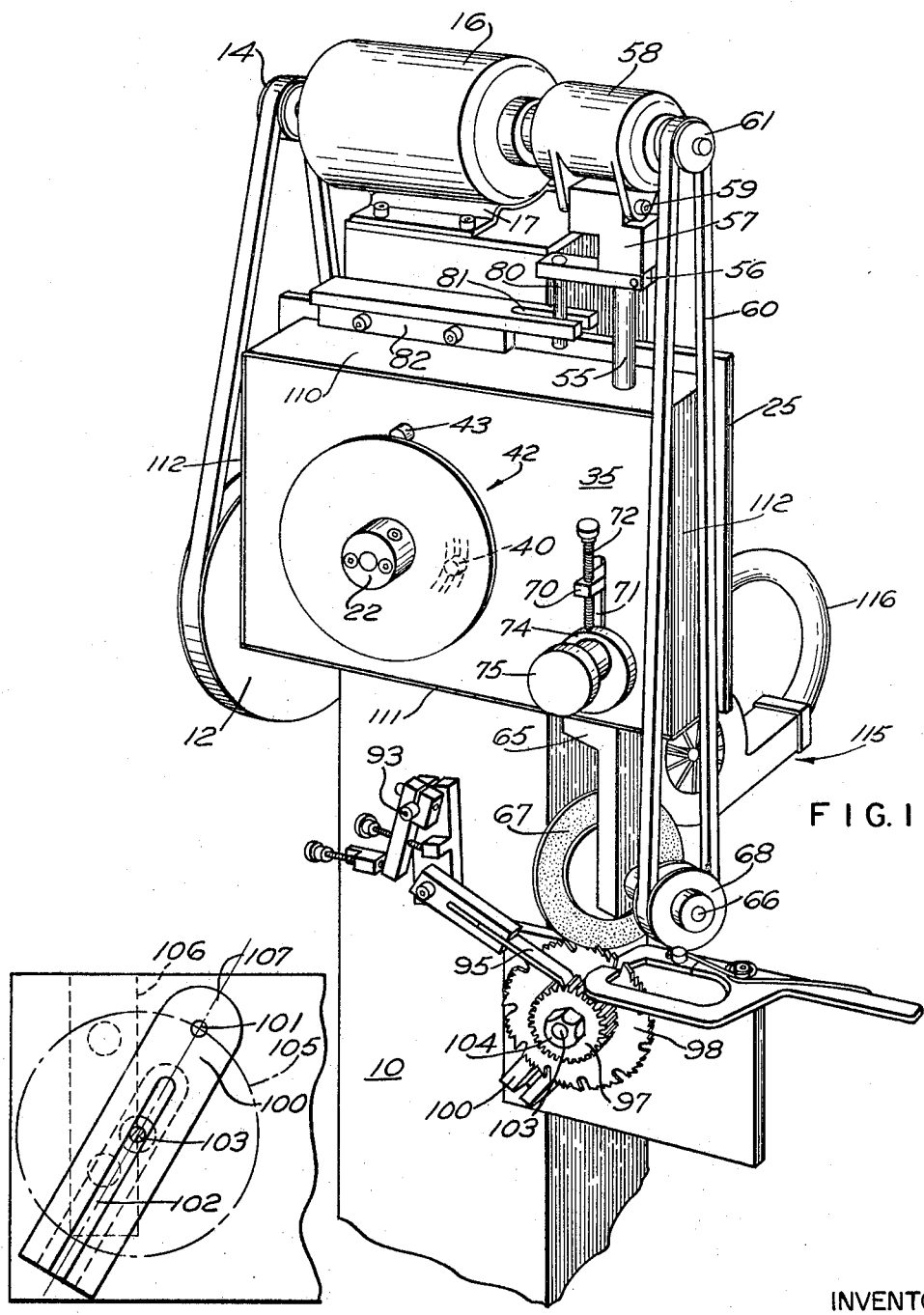
FIG. 1 is a perspective view of the saw sharpening machine.
FIG. 2 is a fragmental detail illustrating the mounting of the saw blade.

With reference to the drawings, 10 (FIG. 1) designates a supporting pedestal standing up to a suitable height from a base which rests on the floor. A drive shaft 11 (FIG. 6) is mounted in suitable bearings in the support 10, which are not shown but are conventional. This drive shaft is driven from a pulley 12 by means of belt 13 operated by pulley 14 on the end of the armature shaft 15 of an electric motor 16 (FIG. 1) having feet 17 at the upper end of the support 10.

Again referring to FIG. 6, a worm 20 on drive shaft 11 rotates worm gear 21 on shaft 22 extending generally at right angles to the shaft 11. This cam shaft 22 is also suitably mounted in bearings in the support stand 10 and carries cams at either end thereof which may be readily accessible from the front and back of stand 10 for interchanging with other cams depending upon the saw teeth to be operated upon.

A back plate 25 (FIGS. 1, 3–5) is fixed on the support 10 and has forwardly extending horizontally disposed upper and lower ribs 26 (FIGS. 3, 5) in spaced relation extending therefrom. These ribs mount between them spaced vertical parallel rods 27 (FIG. 3) which slidably support the head 28 by means of bearings in horizontal bars 29 fixed to the plate 28 and which bearings slidably embrace the spaced rods 27. This head 28 carries forwardly extending spaced vertical ribs 30 in which there are upper bearings 31 and lower bearings 32 for slidably horizontally mounting the spaced rods 33 which are joined at their ends by bars 34 to which the front plate 35 (FIGS. 3, 4, 5) is secured. This front plate thus may have horizontal motion by movement of the rods 33 sliding in the bearings 31 and 32 spring pressed by spring 37 in one direction and may have vertical motion by reason of the head 28 sliding vertically along the rods 27 and moved downwardly by gravity.

A cam follower 40 which may be a roller extends forwardly from the plate 35 having a bearing fixed on the plate and enters the groove 41 (FIG. 6) to follow the cam surface of this groove in the cam designated generally 42 and located at one end of the cam shaft 22. A second cam follower 43 which may be a roller also extends forward from the plate 35 having a bearing fixed on the plate and engages the cam surface 44 of this double cam 42 so as to follow the contour of this cam to direct the vertical movement of the plate 35. These cams will be shaped to correct each other as to vertical and horizontal control to provide the movement desired. By a combination of the movement of these slides, the plate may be made to follow a triangular path such as exists at 46 or a more complex shape 46' (FIG. 7) in the space between two saw teeth.

Figures 3, 7:
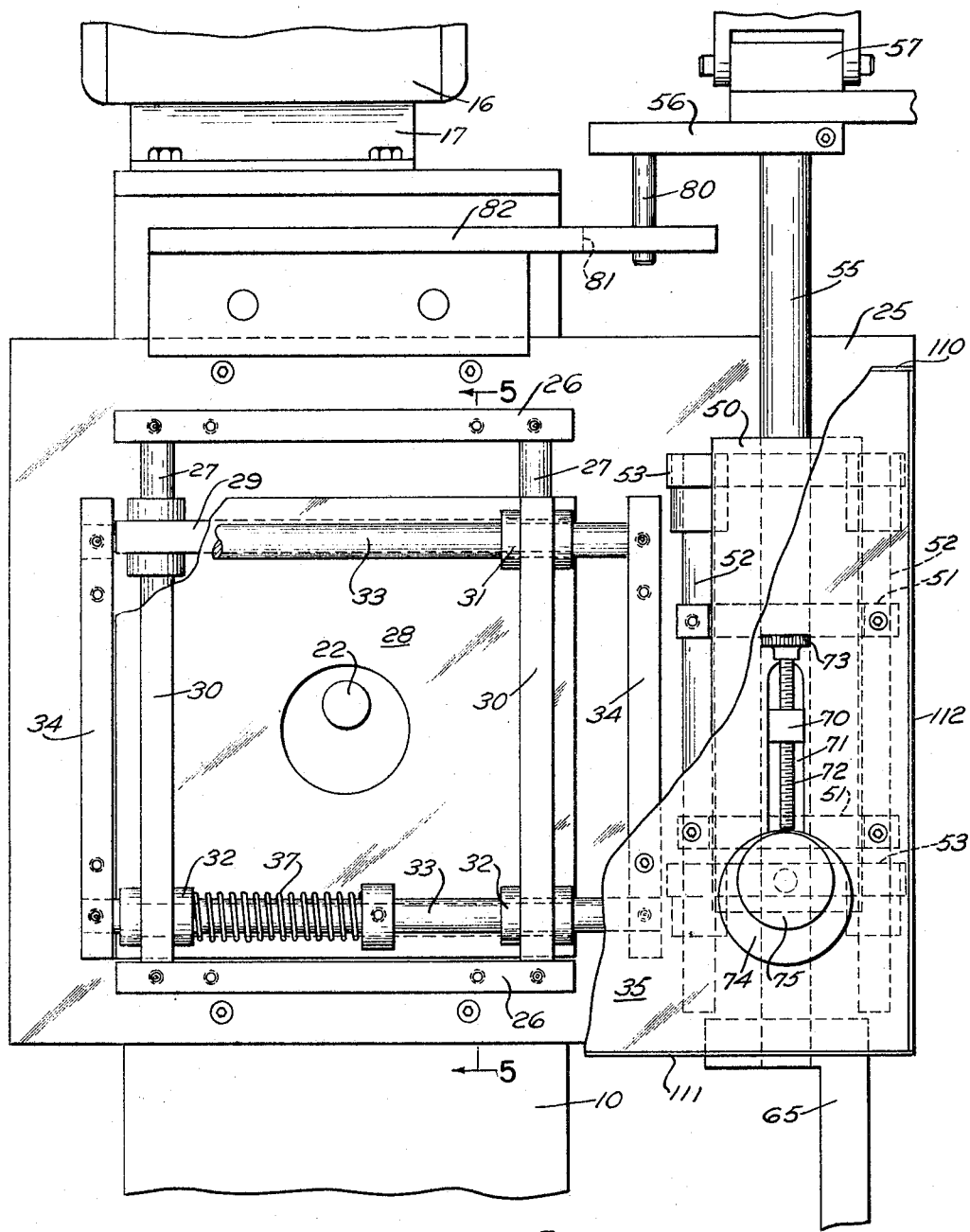
FIG. 3 is an elevation with parts broken away illustrating the slide action of the carriage which carries the grinding wheel.
FIG. 7 is a fragmental elevation of a portion of a circular saw showing different teeth.
Figure 4:
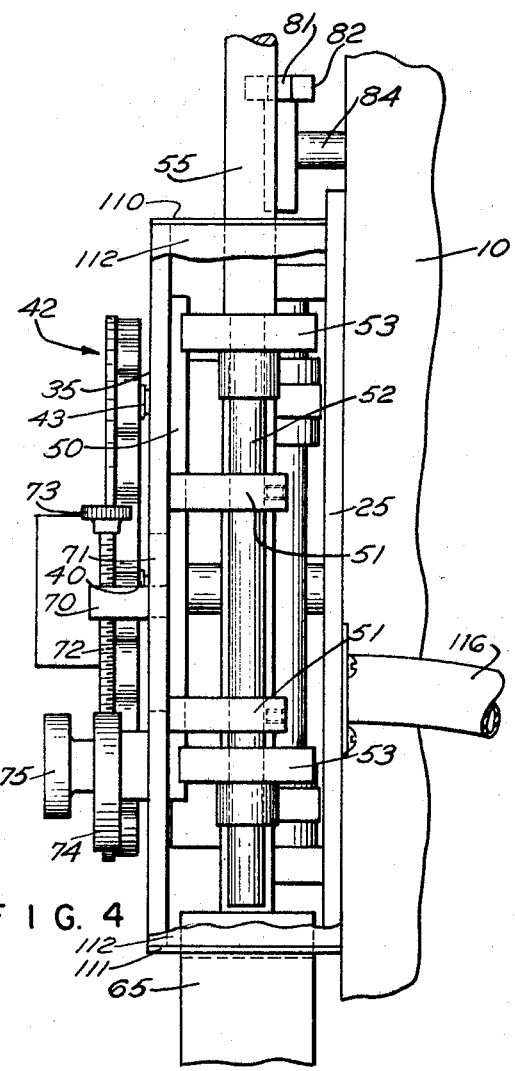
FIG. 4 is an end view of the structure shown in FIG. 3.
Figure 5:
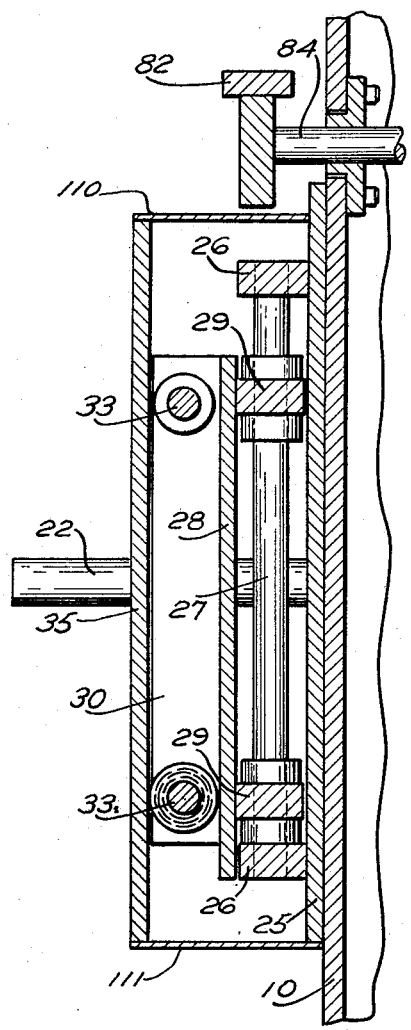
FIG. 5 is a section on line 5—5 of FIG. 3 with front cam omitted.

The plate 35 acts as a carriage for the grinding wheel as will now be explained with referenced to FIGS. 3 and 4. A sub-plate 50 is slidably guided by U-shaped members 51 for vertical movement with reference to the front plate 35. These members also serve to slidably guide space posts 52 (FIG. 3) which may slide in bearings carried by these guides 51. These posts 52 carry cross members 53 adjacent their upper and lower ends which are fixed to the subplate 50 and provide by means of ball bearings a rotatable mounting for the shaft 55 between these two posts 52. At the upper end of this post 55 there is a pedestal 56 which carries a block 57 upon which there is mounted an electric motor 58 which may be rocked about its bracket and axis 59 for placing a belt 60 upon its pulley 61. At the lower end of this post or shaft 55 there is a bracket 65 of L shape which mounts the shaft 66 upon which there is a grinding wheel 67 and a pulley 68 which is driven by means of the belt 60 above referred to.

The sub-plate 60 carries a finger or arm 70 which passes through a slot 71 in the front plate 35 and through which there is threaded a screw 72 manipulated by handle 73, which screw engages the surface of a cam 74 rotatable about a fixed axis carried by the plate 35. A handle 75 on this cam provides for a quick lift of the grinding wheel manually should occasion require. The weight of the entire unit with motor serves to cause the screw 72 to rest against the cam and also serves to adjust the amount that the grinding wheel 67 may be lowered with reference to the work.

A pin 80 depends from the pedestal 56 and enters a deep slot 81 (FIGS. 3, 6) in the slide 82 which is seen in FIG. 6 as a pair of rods 84 slidably mounted in the support and urged in one direction by springs 85 so as to cause the cam follower 86 to engage the cam surface of the cam 88 mounted on the other end of the cam shaft 22 from the cam 42. Thus, by means of this cam follower and its head 89, the rods 84 are slid to move the slide 82 back and forth which, in turn, through pin 80 rocks the shaft 55 which carries the grinding wheel 67 so as to provide the edge of the grinding wheel at the desired angle with reference to the tooth upon which it is operating.

Figure 8:
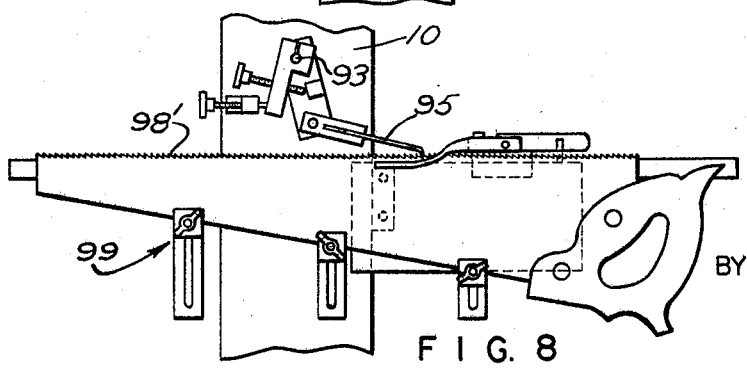
FIG. 8 is an elevation of a mounting for a straight reciprocating saw.

There is also provided on this cam shaft 22 a cam 90 (FIG. 6) which through an adjustable link 91 and crank arm 92 rocks the shaft 93 suitably mounted in bearings in the support 10 to rock the arm 94 and the pawl 95 which may be adjusted to different amounts of throw by the arrangement shown in 96 and which acts upon the ratchet wheel 97 which is clamped to the saw blade 98 (FIG. 1) so as to feed the saw blade teeth progressively in accordance with the ratchet teeth on the ratchet 97. In the event that a straight saw is utilized as in FIG. 8, this pawl may engage the teeth 98' of the straight saw itself or lengthwise ratchet teeth may be provided for a similar function to ratchet wheel 97 to feed the saw as desired. A different mounting 99 for holding the straight saw being, of course, provided in accordance with known principles, in this case, however, the straight saw will always be horizontal as shown rather than angled which has heretofore been usual.

In FIGS. 2 I have illustrated a mounting for the circular saw blade comprising an arm 100 pivoted as at 101 and provided with a slot 102 through which a pin 103 may pass for receiving a nut 104 (see FIG. 1) to clamp a circular saw on this arm 100 in such a position that its saw teeth repersented by the dot-dash line 105 will pass substantially through the pivot 101. The pivot also represents substantially the position of the edge of the grinding wheel when it engages the saw teeth, and it will be observed that it is not at top center of the teeth but rather at one side of the center of the teeth, it being convenient to have the location of this pivot such that the vertical line 106 and the center line 107 of the arm 100 are substantially 30°.

The plate 35 may carry with it a top wall 110 and a bottom wall 111 and end walls 112 which extend to back plate 25 and enclose the operating mechanism for the saw carriage. A positive air pressure may be provided within this enclosure by an air pump 115 and hose 116 which will serve to prevent the entry of grit or dust into the enclosure.

In some cases a saw such as indicated at 98 (FIGS. 1 and 9) will have the grouping of its teeth as at 120 (FIG. 9) with spaces as at 121 so arranged that an unusual ratchet is required and it is desirable to have a ratchet which may be adjusted. I have shown in FIG. 9 such a ratchet comprising two parts 122 and 123 which may be mounted on the shaft 103 and clamped to the saw 98. A mounting hub 125 will be secured on the shaft 103 upon which the ratchet wheel parts 122 and 123 will be held by means of screws 126 passing therethrough, the holes 136 fitting the screw and holes 137 being much larger than the screw to permit some movement. A pin 127 will pass through opening 128 in ratchet part 122 which will hold it in place relative to the hub and will also pass through the elliptical opening 129 in the ratchet part 123 which is also mounted upon the shaft 103. This elliptical opening is much larger, however, than the diameter of the pin 127, and this opening also receives the cam 130 which is rotatably mounted on the pin 127 and located in this opening engaging its edge. A handle 131 on cam 130 enables the cam to be rotated on the pin 127 and as this rotation occurs adjustment of the position of the part 123 follows, thus positioning certain spaced ratchet teeth 133 with reference to the group of teeth 134 on part 122 so as to provide adjustable spacing of a tooth between the groups of teeth 134 to match up to the group of teeth saw on the saw which is to be sharpened. When the required adjustment is obtained, a check nut 135 will hold the cam in position.

I claim:

1. In a saw sharpening machine, a supporting frame, means to mount on said frame the blade of a saw to be held in the plane of the blade, means to progressively advance the teeth of the saw in said plane, a carriage, a grinding wheel, means to mount said grinding wheel on said carriage for oscillating movement relative thereto, means to control said oscillating movement, means to horizontally and vertically slidably mount said carriage, cam means to control said slidable mountings in accordance with the shape of the cam means, and drive means to operate all of said control means in timed relation to each other.

2. In a saw sharpening machine as in claim 1 wherein said control means include cams.

3. In a saw sharpening machine as in claim 1 wherein said control means include cams all on a single shaft.

4. In a saw sharpening machine as in claim 1 wherein said control means include two cam controls at opposite ends of a cam shaft with a drive therefor intermediate said cams.

5. In a saw sharpening machine as in claim 1 wherein said slidable mountings comprise spaced generally right angularly extending rods.

6. In a saw sharpening machine as in claim 1 wherein said grinding wheel is vertically slidable with reference to said carriage.

7. In a saw sharpening machine as in claim 1 wherein said grinding wheel is vertically slidable with reference to said carriage and bears through adjustable means on a cam which may be used to quick lift said wheel with reference to said carriage.

8. In a saw sharpening machine, a supporting frame, means to mount on said frame the blade of a saw, means to progressively advance the teeth of the saw, a carriage, a grinding wheel, means to mount said grinding wheel on said carriage, means to horizontally and vertically slidably mount said carriage, a cam to control the vertical movement of said carriage in response to the shape of the cam, a second cam to control the horizontal movement of said carriage in response to the shape of the cam, and a cam follower for each of said cams on said carriage, said follower for each of said cams on said carriage, said followers having bearings fixed relative to each other.

9. In a saw sharpening machine as in claim 8 wherein the cams are shaped to correct each other to provide the motion desired.

10. In a saw sharpening machine as in claim 8 wherein a casing envelopes the driving mechanism and a positive pressure is provided in said casing to eject grit or dust.

11. In a saw sharpening machine as in claim 1 wherein the means to progressively advance the teeth of the saw comprises an adjustable ratchet having two parts and each carrying teeth for engagement with a pawl, said teeth being movable one relative to the other by movement of said two parts of the ratchet wheel.

References Cited

UNITED STATES PATENTS 2,956,376  10/1960  Shanley _____ 51—35
3,008,357  11/1961  Burns _____ 76—41

BERNARD STICKNEY, Primary Examiner

U.S. Cl. X.R.

51—35; 125—11